(12) United States Patent
Adair et al.

(10) Patent No.: US 7,429,413 B2
(45) Date of Patent: Sep. 30, 2008

(54) NONMETALLIC LABEL WITH METALLIC APPEARANCE

(75) Inventors: Paul C. Adair, Germantown, WI (US); Jeana S. Kemppainen, West Bend, WI (US)

(73) Assignee: Brady Worldwide, Inc., Milwaukee, WI (US)

( * ) Notice: Subject to any disclaimer, the term of this patent is extended or adjusted under 35 U.S.C. 154(b) by 234 days.

(21) Appl. No.: 11/276,740

(22) Filed: Mar. 13, 2006

(65) Prior Publication Data

US 2007/0212506 A1   Sep. 13, 2007

(51) Int. Cl.
*B32B 9/00* (2006.01)
*B32B 33/00* (2006.01)
*B42D 15/00* (2006.01)
*G03C 3/00* (2006.01)

(52) U.S. Cl. ............... 428/40.1; 428/42.1; 428/915; 428/916; 283/72; 283/81; 283/94; 430/9; 430/10

(58) Field of Classification Search ............... 428/40.1, 428/42.1, 41.8, 42.2, 42.3, 914–916; 283/72, 283/81, 100, 101, 103, 94; 430/9, 10
See application file for complete search history.

(56) References Cited

U.S. PATENT DOCUMENTS

| | | | |
|---|---|---|---|
| RE24,906 E | 12/1960 | Ulrich | |
| 2,973,286 A | 2/1961 | Ulrich | |
| 4,082,873 A | 4/1978 | Williams | |
| 4,121,003 A | 10/1978 | Williams | |
| 4,184,701 A | 1/1980 | Franklin et al. | |
| 5,153,042 A | 10/1992 | Indrelie | |
| 5,346,259 A | 9/1994 | Mocilnikar et al. | |
| 5,441,809 A | 8/1995 | Akhter | |
| 5,683,774 A | 11/1997 | Faykish et al. | |
| 5,874,143 A * | 2/1999 | Peloquin et al. | ............ 428/40.1 |
| 6,372,341 B1 * | 4/2002 | Jung et al. | ................... 428/354 |
| 6,618,024 B1 | 9/2003 | Adair et al. | |
| 2002/0135481 A1 | 9/2002 | Conwell et al. | |

FOREIGN PATENT DOCUMENTS

| | | |
|---|---|---|
| EP | 0755776 A1 | 1/1997 |
| WO | 96/02048 A1 | 1/1996 |

* cited by examiner

*Primary Examiner*—Patricia L Nordmeyer
(74) *Attorney, Agent, or Firm*—Whyte Hirschboeck Dudek SC

(57) ABSTRACT

In one embodiment, a nonmetallic, tamper-indicating, multi-layer label with a metallic appearance is described. The label comprises a pearlescent layer, a film layer, a patterned release layer, and a pigmented adhesive layer with the provisos that (i) the pigmented adhesive layer is an exterior layer of the label and is substantially free of pearlescent pigment, and (ii) the patterned release layer is an interior layer of the label. Each layer has first and second opposing planar surfaces, and each layer is in intimate contact with the layer or layers immediately adjacent to it. In another embodiment, two layers, one layer comprising a non-pearlescent pigment and the other layer comprising the adhesive, replace the pigmented adhesive layer.

24 Claims, 3 Drawing Sheets

PEARLESCENT

FILM

PATTERNED RELEASE

PIGMENTED ADHESIVE

RELEASE LINER

FIG. 1

| PEARLESCENT |
| :---: |
| FILM |
| PATTERNED RELEASE |
| PIGMENTED ADHESIVE |
| RELEASE LINER |

FIG. 2

| FILM |
| :---: |
| PEARLESCENT |
| PATTERNED RELEASE |
| PIGMENTED ADHESIVE |
| RELEASE LINER |

FIG. 3

| FILM |
|---|
| PATTERNED RELEASE |
| PEARLESCENT |
| PIGMENTED ADHESIVE |
| RELEASE LINER |

FIG. 4

| PEARLESCENT |
|---|
| FILM |
| PATTERNED RELEASE |
| PIGMENT |
| ADHESIVE |
| RELEASE LINER |

FIG. 5

| FILM |
|---|
| PEARLESCENT |
| PATTERNED RELEASE |
| PIGMENT |
| ADHESIVE |
| RELEASE LINER |

FIG. 6

| FILM |
|---|
| PATTERNED RELEASE |
| PEARLESCENT |
| PIGMENT |
| ADHESIVE |
| RELEASE LINER |

NONMETALLIC LABEL WITH METALLIC APPEARANCE

FIELD OF THE INVENTION

This invention relates to labels. In one aspect, the invention relates to labels that have a metal appearance but are nonmetallic in composition while in another aspect, the invention relates to a nonmetallic label with a metallic appearance that can be used in a tamper-evident format. In yet another aspect, the invention relates to objects bearing the nonmetallic label with a metallic appearance, particularly cell phones.

BACKGROUND OF THE INVENTION

Labels with a metallic appearance are often used on products to enhance their consumer appeal. The metallic appearance is normally imparted by a sputtered aluminum coating on the underside of a transparent film. This aluminum or other metal coating, however, can also impart certain undesired properties, e.g., sensitivity to sodium hydroxide, conductivity and/or interference with reception of radio waves or microwaves. For example, a metalized film used as part of a radio frequency identification (RFID) label can render the label unreadable.

One solution to this problem is described in U.S. Pat. No. 6,618,024 in which a metallic effect is imparted to a multi-layer film through the use of multiple nonmetallic reflective surfaces within the film. This film can then be used as part of a RFID label construction without causing interference.

Although the solution of U.S. Pat. No. 6,618,024 is useful, instances exist in which a different method of imparting a nonmetal, metallic appearance is needed. For example, one common form of tamper-evident label leaves behind a patterned adhesive footprint upon removal of the label from the object to which it is attached (e.g., U.S. Pat. Nos. 4,082,873, 4,121,003, 4,184,701 and 5,153,042). Nonmetallic reflective film, such as that described in U.S. Pat. No. 6,618,024, is opaque and as such, it does lend itself for use in a tamper-evident label. Other methods to impart a metallic appearance to a nonmetal label would clearly be useful in a variety of applications.

SUMMARY OF THE INVENTION

In one embodiment the invention is a nonmetallic, tamper-indicating, multi-layer label with a metallic appearance. The label comprises a pearlescent layer, a film layer, a patterned release layer, and a pigmented adhesive layer with the provisos that (i) the pigmented adhesive layer is substantially free of pearlescent pigment and the layer is an exterior layer of the label, and (ii) the patterned release layer is an interior layer of the label. Each layer has first and second opposing planar surfaces, and each layer is in intimate contact with the layer or layers immediately adjacent to it. In another embodiment of the invention, two layers, one layer comprising the pigment and the other layer comprising the adhesive, replace the pigmented adhesive layer. In this embodiment, the adhesive layer is an exterior layer of the label, and the pigmented layer is not always substantially free of pearlescent pigment, but it is always adjacent to and in intimate contact with the interior planar surface of the adhesive layer. In both embodiments, the exterior planar surface of the layer that comprises the adhesive may be in intimate contact with a release liner to protect the adhesive until the label is ready to be applied to an object.

In a first specific embodiment, the invention is a nonmetallic, tamper-indicating, multi-layer label with a metallic appearance, the label comprising:

A. A pearlescent layer comprising a pearlescent pigment and having first and second opposing planar surfaces,
B. A film layer comprising a transparent or translucent polymer film and having first and second opposing planar surfaces, the first planar surface of the film layer in intimate contact with the second planar surface of the pearlescent layer,
C. A patterned release layer comprising a release agent arrayed in a pattern and having first and second opposing planar surfaces, the first planar surface of the patterned release layer in intimate contact with at least a portion of the second planar surface of the film layer, and
D. A pigmented adhesive layer substantially free of pearlescent pigment and having first and second opposing planar surfaces, the first planar surface of the adhesive layer in intimate contact with the second planar surface of the patterned release layer and the portion of the second planar surface of the film not in intimate contact with the first planar surface of the patterned release layer.

In second specific embodiment, the invention is a nonmetallic, tamper-indicating, multi-layer label with a metallic appearance, the label comprising:

A. A film layer comprising a transparent or translucent polymer film and having first and second opposing planar surfaces,
B. A pearlescent layer comprising pearlescent pigment and having first and second opposing planar surfaces, the first planar surface of the pearlescent layer in intimate contact with the second planar surface of the film layer,
C. A patterned release layer comprising a release agent arrayed in a pattern and having first and second opposing planar surfaces, the first planar surface of the patterned release layer in intimate contact with at least a portion of the second planar surface of the pearlescent layer, and
D. A pigmented adhesive layer substantially free of pearlescent pigment having first and second opposing planar surfaces, the first planar surface of the adhesive layer in intimate contact with the second planar surface of the patterned release layer and the portion of the second planar surface of the pearlescent layer not in intimate contact with the first planar surface of the patterned release layer.

In third specific embodiment, the invention is a nonmetallic, tamper-indicating, multi-layer label with a metallic appearance, the label comprising:

A. A film layer comprising a transparent or translucent polymer film and having first and second opposing planar surfaces,
B. A patterned release layer comprising a release agent arrayed in a pattern and having first and second opposing planar surfaces, the first planar surface of the patterned release layer in intimate contact with at least a portion of the second planar surface of the film layer,
C. A pearlescent layer comprising a pearlescent pigment and having first and second opposing planar surfaces, the first planar surface of the pearlescent layer in intimate contact with the second planar surface of the patterned release layer and the portion of the second planar surface of the film layer not in intimate contact with the first planar surface of the patterned release layer, and
D. A pigmented adhesive layer substantially free of pearlescent pigment having first and second opposing planar surfaces, the first planar surface of the adhesive layer in intimate contact with the second planar surface of the pearlescent layer.

In fourth specific embodiment, the invention is a nonmetallic, tamper-indicating, multi-layer label with a metallic appearance, the label comprising:

A. A pearlescent layer comprising a pearlescent pigment and having first and second opposing planar surfaces,
B. A film layer comprising a transparent or translucent polymer film and having first and second opposing planar surfaces, the first planar surface of the film layer in intimate contact with the second planar surface of the pearlescent layer,
C. A patterned release layer comprising a release agent arrayed in a pattern and having first and second opposing planar surfaces, the first planar surface of the patterned release layer in intimate contact with at least a portion of the second planar surface of the film layer,
D. A pigmented layer substantially free of pearlescent pigment and having first and second opposing planar surfaces, the first planar surface of the pigmented layer in intimate contact with the second planar surface of the patterned release layer and the portion of the second planar surface of the film layer not in intimate contact with the first planar surface of the patterned release layer, and
E. An adhesive layer comprising an adhesive and having first and second opposing planar surfaces, the first planar surface of the adhesive layer in intimate contact with the second planar surface of the pigmented layer.

In fifth specific embodiment, the invention is a nonmetallic, tamper-indicating, multi-layer label with a metallic appearance, the label comprising:

A. A film layer comprising a transparent or translucent polymer film and having first and second opposing planar surfaces,
B. A pearlescent layer comprising a pearlescent pigment and having first and second opposing planar surfaces, the first planar surface of the pearlescent layer in intimate contact with the second planar surface of the film layer,
C. A patterned release layer comprising a release agent arrayed in a pattern and having first and second opposing planar surfaces, the first planar surface of the patterned release layer in intimate contact with at least a portion of the second planar surface of the pearlescent layer,
D. A pigmented layer substantially free of pearlescent pigment and having first and second opposing planar surfaces, the first planar surface of the pigmented layer in intimate contact with the second planar surface of the patterned release layer and the portion of the second planar surface of the pearlescent layer not in intimate contact with the first planar surface of the patterned release layer, and
E. An adhesive layer comprising an adhesive and having first and second opposing planar surfaces, the first planar surface of the adhesive layer in intimate contact with the second planar surface of the pigmented layer.

In sixth specific embodiment, the invention is a nonmetallic, tamper-indicating, multi-layer label with a metallic appearance, the label comprising:

A. A film layer comprising a transparent or translucent polymer film and having first and second opposing planar surfaces,
B. A patterned release layer comprising a release agent arrayed in a pattern and having first and second opposing planar surfaces, the first planar surface of the patterned release layer in intimate contact with at least a portion of the second planar surface of the film layer,
C. A pearlescent layer comprising a pearlescent pigment and having first and second opposing planar surfaces, the first planar surface of the pearlescent layer in intimate contact with the second planar surface of the patterned release layer and the portion of the second planar surface of the film layer not in intimate contact with the first planar surface of the patterned release layer,
D. A pigmented layer substantially free of pearlescent pigment and having first and second opposing planar surfaces, the first planar surface of the pigmented layer in intimate contact with the second planar surface of the pearlescent layer, and
E. An adhesive layer comprising an adhesive and having first and second opposing planar surfaces, the first planar surface of the adhesive layer in intimate contact with the second planar surface of the pigmented layer.

In all of the above specific embodiments, the exterior planar surface of the layer that comprises the adhesive may be in intimate contact with a release liner to protect the adhesive until the label is ready to be applied to an object.

In another embodiment, the invention is a nonmetallic, tamper-indicating, multi-layer RFID label with a metallic appearance while in still another embodiment, the invention is an object, such as a cell phone, bearing a nonmetallic, tamper-indicating, multi-layer label as described in one of the embodiments above.

BRIEF DESCRIPTION OF THE DRAWINGS

Many aspects of the invention will be better appreciated and understood in conjunction with the following drawings and detailed description of the invention in which like reference numerals generally represent like elements.

FIG. 1 is a schematic depiction of a cross-section of the first specific embodiment of a nonmetallic, tamper-indicating, multi-layer label with a metallic appearance and comprising an optional release liner.

FIG. 2 is a schematic depiction of a cross-section of the second specific embodiment of a nonmetallic, tamper-indicating, multi-layer label with a metallic appearance and comprising an optional release liner.

FIG. 3 is a schematic depiction of a cross-section of the third specific embodiment of a nonmetallic, tamper-indicating, multi-layer label with a metallic appearance and comprising an optional release liner.

FIG. 4 is a schematic depiction of a cross-section of the fourth specific embodiment of a nonmetallic, tamper-indicating, multi-layer label with a metallic appearance and comprising an optional release liner.

FIG. 5 is a schematic depiction of a cross-section of the fifth specific embodiment of a nonmetallic, tamper-indicating, multi-layer label with a metallic appearance and comprising an optional release liner.

FIG. 6 is a schematic depiction of a cross-section of the sixth specific embodiment of a nonmetallic, tamper-indicating, multi-layer label with a metallic appearance and comprising an optional release liner.

DETAILED DESCRIPTION OF THE INVENTION

As used in the description of the invention, the following terms, and terms similar to these terms, are defined as follows:

"Nonmetallic" means that the label is free of a metal layer or coating. Nonmetallic does not mean that the label is free of non-conductive metal oxide pigments or other such non-conductive compounds in one or more layers, e.g., the pigmented or pigmented adhesive layer, of the label.

"Tamper-indicating" means that upon full or partial removal of a label that has been attached to an object or substrate, the label will delaminate or otherwise dissemble in a manner such that at least a portion of the pigmented adhesive or pigmented layer in registration with the transparent or translucent film remains on the object or substrate resulting in a label that has a visually perceptible change in at least a portion of its background color. Typically, at least a portion of the adhesive and pigment not in registration with the film is retained on the label.

"Layer" means a single thickness, coating or stratum spread out or covering a surface.

"Multi-layer" means at least four layers.

"Metallic appearance" means that the label appears to have, but does not have, a metal coating layer or coating. "Planar surface" means the flat surfaces of the layers that are in contact with the opposite and adjacent surfaces of the adjoining layers. Planar surfaces are in distinction to edge surfaces. A rectangular layer or label comprises two planar surfaces and four edge surfaces. A circular layer or label comprises two planar surfaces and one edge surface.

"In intimate contact" means that one planar surface of one layer and one planar surface of another layer, or the adhesive layer of a label and the exterior surface of an object or substrate to which the adhesive layer of the label is applied, are in an adhering relationship to one another such as a coating is in an adhering relationship with the substrate to which it is applied.

"Substantially free of pearlescent pigment" means that the pigment of the pigmented layer or the pigmented adhesive layer comprises at least about 90, preferably at least about 95 and more preferably at least about 98, weight percent, based on the weight of pigment in the pigmented or pigmented adhesive layer, of one or more pigments other than a pearlescent pigment. Most preferably, all of the pigment of the pigmented or pigmented adhesive layer is a pigment other than a pearlescent pigment.

The pearlescent layer comprises a pearlescent pigment, typically in combination with a binder. Pearlescent pigments are also known as opalescent, iridescent or luster pigments. By far the most common pearlescent pigments are based on titania-coated mica (e.g., the Iriodin® product line from The Merck Group) but other pearlescent pigments can also be used in the practice of this invention. For example, other such pigments include metal-oxide coated borosilicate flakes (e.g., the Firemist®) product line from Englehard Corporation, and the Mirval® product line also from The Merck Group), metal-oxide coated silicon dioxide flakes (e.g., the Colorstream® product line also from The Merck Group), and metal-oxide coated aluminum oxide flakes (e.g., the Xirallic® product line also from The Merck Group). Still other commercially available pearlescent pigments include the Mearlin®, MagnaPearl® and Lumina® product lines from Engelhard Corporation.

Pearlescent pigments come in various colors, e.g., silver, gold (Iriodin® 303), bronze (Iriodin® 500), red (Iriodin® 504), blue (Xirallic® T60-23 Galaxy Blue), turquoise and green, with a wide range of metallic effect. One particularly preferred color for use in many label applications, e.g., cell phones, is silver. Typical silver pearlescent pigments are Iriodin® 100 and Xirallic® T60-10 SW Crystal Silver (Merck) or MagnaPearl® 1000 (Engelhard).

The purpose of the binder in the pearlescent layer is to act as a carrier for the pearlescent pigment and to bind the coating (i.e., layer) to the adjacent layers, e.g., the film layer. Typical binders are aqueous dispersions or organic solvent solutions of acrylic or styrene acrylic polymers, aqueous dispersions of ionic polymers (such as a sodium salt of ethylene acrylic acid), or organic solvent solutions of polyester polymers.

The binder is selected with several criteria as a guide. If the pearlescent layer is the upper-most layer, then the binder is preferably selected such that it can receive ink in a thermal transfer printing process. In this instance the binder preferably provides a non-tacky coating that is sufficiently flexible that it does not experience any substantial cracking as the label is flexed.

The pearlescent layer can contain other compounds and materials to enhance the performance of both the layer and the label. These compounds and materials include defoamers, wetting agents and cross-linkers.

The pearlescent layer or coating can be located in various positions within the label. The pearlescent layer can be above or below the film layer and above or below the patterned release layer. The thickness of the pearlescent layer relative to the thickness of the other layers comprising the label can vary widely with the understanding that the amount of pigment encountered by light in making a round trip into and back out of the layer does not block the visibility of a tamper-evident footprint through the layer. Preferably, the pearlescent layer is in a thickness range of about 15 to about 50 microns.

The film layer is transparent or translucent, and its chemical composition is not critical to the invention so long as it has sufficient film integrity for its intended use. Typically, it comprises polyester, such as a condensation product of terephthalic acid and a glycol, e.g., ethylene glycol, isophthalic acid and a glycol, or mixtures of terephthalic acid, isophthalic acid and a glycol. One particularly useful film of this type is a highly oriented polyester film known in the trade as Mylar® film, which has been print treated, i.e., coated or processed in a known manner to increase its ink receptiveness.

Print, i.e., information in the form of words, numbers, designs, code bars or other forms of human or machine readable graphics, is typically applied to the first surface of the first layer of the label, e.g., the surface open to the environment of the film or pearlescent layer in FIGS. 1-6. Preferably, the first layer is the film layer, and the print can be applied by any one of a number of different conventional processes, e.g., flexographic, letterpress, screen, gravure and photographic printing. For print-on-demand applications, a thermal transfer process typically applies the print. For pre-print applications, ultraviolet, aqueous or solvent inks are typically used. The information can be applied to a layer before or after assembly of the complete label although it is typically applied after the label has been completely assembled. The chemical composition of the ink or other substance employed to print the pattern is not critical, but it must produce a printed pattern that adheres sufficiently to the surface of the layer to which it is applied to allow for a reasonable degree of permanency.

Other useful polymer films include films of acrylic polymers and interpolymers; cellulosic polymers, including cellulose acetate, cellulose acetate butyrate, cellulose acetate propionate and mixtures of these polymers; polyolefins, including homopolymers and interpolymers of ethylene or propylene; polystyrene, polycarbonates, and vinyl chloride polymers and interpolymers, including such polymers compounded with property modifying agents such as those known in the film art; as well as surface treated or coated films of such polymers, treated, for example, to make them more ink receptive.

The patterned release layer comprises a release agent arrayed in a pattern of any design. The release agent can be any material that will impart weak adhesive strength between the patterned release layer and one of the layers to which it is in intimate contact relative to the adhesive strength between the adhesive layer and the object or substrate to which the label is attached. Due to this relative weak adhesive strength, the label will delaminate or otherwise dissemble at the interface of this layer and one of its adjacent layers thus providing visible evidence that the label was removed, or its removal was attempted. Preferred release coatings include polyvinyl alcohol, silicones, fluorinated chemicals and waxes. The pattern typically is in the form or a word such as VOID or BREAK, but geometric and graphic patterns are also commonly used, e.g., a checkerboard or logo design.

The adhesive layer can comprise any adhesive that is effective in binding the label to an external surface of the object to which the label is affixed. As long as the adhesive exhibits good peel strength, either a pressure sensitive or heat-sealable adhesive can be used. Preferably, but not necessarily, the adhesive also exhibits transparency and low haze. If the adhesive is a pressure sensitive adhesive, then an aggressive pressure sensitive adhesive is preferred, such as one of the high-strength acrylic pressure sensitive adhesives. Particularly preferred pressure sensitive adhesives include copolymers of alkyl acrylates that have a straight chain of from 4 to 12 carbon atoms and a minor proportion of a highly polar copolymerizable monomer such as acrylic acid. These adhesives are more fully described in U.S. Pat. No. Re. 24,906 and U.S. Pat. No. 2,973,286. Alternative pressure sensitive adhesives include ultraviolet curable pressure sensitive adhesives such as Durotak 4000 that is available from National Starch and Chemical.

If the adhesive is a heat-sealable adhesive, then it typically comprises one or more styrenic block copolymers, an anti-block agent, and a tackifying agent. These adhesives are more fully described in U.S. Pat. No. 5,441,809.

In certain and preferred embodiments of the invention, the adhesive layer also comprises one or more inorganic non-pearlescent pigments, such as titanium dioxide, aluminum oxide, manganese oxide, various clays, silica, talc, a mixed aluminum/silicon oxide, calcium carbonate, barium sulfate, carbon black, or any of the organic colored pigments widely available in commerce, e.g., phthalocyanine pigments such as Pigment Blue 15, Pigment Green 7 and Pigment Green 36; pigments based on anthraquinone such as Pigment Yellow 24 and Pigment Orange 43; quinacridone pigments such as Pigment Violet 19 and Pigment Red 122; lithol rubine pigments such as Pigment Red 57:1; barium lithol pigments such as Pigment Red 49:1; Red Lake C; diarylide yellow pigments such as Pigment Yellow 14, 13 or 12; and Alkali Blue 19 or 61. To best impart a metallic look to the label, a pigmented or colored layer substantially free of a pearlescent pigment is behind or beneath the pearlescent layer. This pigmented layer substantially free of pearlescent pigment is either directly adjacent to (i.e., in immediate contact with) or indirectly adjacent to (i.e., not in immediate contact with or, in other words, one or more layers removed from) the pearlescent layer.

The amount and nature of the non-pearlescent pigment can vary to convenience with the understanding that the pigment is generally compatible with the other components of the layer, if any. Typically, the concentration of pigment is normally sufficient to impart reasonable opacity to the finished label, For a silver or gunmetal appearance, the backing color is gray or black. Carbon black is an excellent black pigment, and a mixture of carbon black and titanium dioxide provides an excellent grey color (the intensity of the grey dependent upon, among other things, the relative amounts of carbon black and titanium dioxide used in the mixture). The amount of pigment will vary with the selected pigment, and typically the pigment constitutes between about 0.5 and 25 weight percent of the layer. The thickness of the pigmented adhesive layer is between about 25 and about 50 microns.

In another embodiment, the non-pearlescent pigment forms a separate, interior layer of the label intermediate and adjacent to both the adhesive and either the patterned release or pearlescent layers. In this embodiment, the pigment is typically mixed with a binder, preferably a polymeric binder similar to the binder used with the pearlescent pigment. Here too, the relative amount of pigment to binder can vary widely and will depend in large part upon the nature of both the pigment and binder, but typically the pigment will constitute between about 0.5 and about 25 weight percent of the layer. The layer itself will typically, but not necessarily, be between about 25 and about 50 microns in thickness.

Optionally, and preferably, the labels include a release liner that is adjacent to and in intimate contact with the layer comprising the adhesive to protect the adhesive before the label is applied to an object or substrate, e.g., during manufacture, printing, shipping and storage. Typical and commercially available release liners comprise a silicone-treated release paper, and are available from Loparex (products such as 1011, 22533 and 11404), CP Films and Akrosil, In another optional embodiment of the invention, the label also contains a radio frequency transponder, also known as an RFID tag. These tags, their construction and use, are well known in the art, and are more fully described in U.S. Pat. No. 6,618,024 and US 2002/0135481 A1. The labels of this invention lend themselves well to use with RFID tags because the labels are nonmetallic and thus will not interfere with the transmission of radio waves between the transponder and a sender/receiver of the same. The RFID tags are located either on or within the label. If the tag is located on the surface of the first layer of the label, then the tag is typically covered with a coating to insure adhesion to the label. If the tag is located within the label, then it can be incorporated between any two layers of the label, preferably between the first and second layers of the label particularly if the first two layers of the label comprise the film and pearlescent layers.

The constructions of the labels of this invention typically take one of six formats. In three of the formats, the label comprises four (five with the optional release liner) layers the bottom layer of which is a pigmented adhesive (or, if present, the optional release liner). Each layer has first and second opposing planer surfaces and two pair of opposing edge surfaces. One pair of edge surfaces intersects the other pair of edge surfaces. In the first format, the first planar surface of the pearlescent layer is open to the environment while the second planar surface is in intimate contact with the first planar surface of the film. The second planar surface of the film is in intimate contact with the first planar surface of the patterned release layer. In the first three formats of the film as depicted in FIGS. 1-3, the second planar surface of the pigmented adhesive is for application to the object to be identified while the first planar surface of the pigmented adhesive is in contact with either the second planar surface of the patterned release layer or the pearlescent layer. The differences between the first three formats of the label as shown in FIGS. 1-3 is the relative position of the pearlescent, film and pattern release layers to one another.

Specifically and referring to FIG. 1, the top or first layer is the pearlescent pigment in intimate contact with the second or film layer. If bearing information (not shown), the information, e.g., ink in the form of words, numbers, patterns, etc., is typically located on either side of the film or on the first surface of the pearlescent layer. The film, or the film and information in the form of ink or other information-conveying medium, is in intimate contact with the patterned release layer (a particular pattern not show here or in any of the other Figures), The patterned release layer, in turn, is in intimate contact with the pigmented adhesive layer. Due to the fact that a pattern, by its very nature, has gaps or open spaces within it, e.g., the centers of the O and D in VOID, certain areas of the pigmented adhesive layer will be in intimate contact with certain areas of the film layer (or with regards to the other embodiments of this invention as depicted in the other Figures, with the corresponding certain areas of the layer that is positioned above the patterned release layer).

The label of FIG. 1, as well as the labels of all of the other figures, is shown with an optional release liner. Alternatively, the label can be manufactured without a release liner (not shown) or, more commonly, manufactured with a release liner and then the liner removed and the label applied to an object or substrate (not shown). The label of FIG. 1 can also comprise an RFID tag (not shown). If the label comprises such a tag or similar inclusion, preferably it would be located between the pearlescent layer and the film layer.

FIG. 2 is similar to FIG. 1 except that the order of the film and pearlescent layers are reversed. In this embodiment, the information (not shown) is carried on either planar surface of the film layer, or on the first planar surface of the pearlescent layer. If carried on the first planar surface of the film layer, then optionally the information is covered with a transparent or translucent protective coating (not shown). If this embodiment of the invention includes an RFID tag (not shown), then the tag is preferably located either on the first planar surface of the film and optionally covered with a protective coating, or between the film and pearlescent layers.

FIG. 3 is similar to FIG. 2 except that the order of the pearlescent and patterned release layer is reversed. If this embodiment of the invention includes an RFID tag (not shown), then the tag is preferably located between the film and patterned release layers or between the patterned release and pearlescent layers.

FIGS. 4-6 illustrate three other formats of the label of this invention, each format comprising five (six with the optional release liner) layers. In these formats the pigmented adhesive layer is replaced with a separate pigmented layer and a separate adhesive layer, but the second planar surface of the pigmented layer is always in intimate contact with the first planar surface of the adhesive layer. Otherwise, the formats of FIGS. 4-6 are the same with respect to the arrangement of the pearlescent, film and patterned release layers as the formats of FIGS. 1-3, respectively. In these embodiments the optional RFID tag is preferably located on one of the two planar surfaces of the film.

The patterned release layer can comprise any transparent material that provides a weak bond to the immediate adjoining layers with which it is in intimate contact. The pattern of this layer is typically of the form of a word, e.g., VOID, or in the pattern of a checkerboard such that pigment from the pearlescent, pigmented layer or pigmented adhesive is in direct and intimate contact with the planar surface immediately above the patterned release layer. In this manner if the label is removed or partially removed from the object, an indicating pattern on the surface of the object to which the label was applied remains.

The relative thickness of one layer to another is not critical to the practice of this invention, and it can vary to convenience. The film layer is typically between about 6 and about 250, preferably between about 12 and about 125 and more preferably between about 25 and about 63, microns in thickness; the pearlescent layer is typically between about 6 and about 125, preferably between about 12 and about 75 and more preferably between about 15 and about 50, microns in thickness; the patterned release layer is typically between about a molecular monolayer and about 25, preferably between about 0.5 and about 12 and more preferably between about 2 and about 5, microns in thickness; and the pigmented adhesive layer is typically between about 5 and about 125, preferably between about 12 and about 75 and more preferably between about 25 and about 50, microns in thickness. If the pigmented adhesive layer is replaced with a separate layer of pigment and a separate layer of adhesive, then the pigmented layer is typically between about 6 and about 125, preferably between about 12 and about 75 and more preferably between about 25 and about 50, microns in thickness, and the adhesive layer is typically between about 5 and about 125, preferably between about 12 and about 75 and more preferably between about 25 and about 50, microns in thickness. Preferably, the label thickness, without an RFID tag or other inclusion and without a release liner is between about 50 and about 350, preferably between about 75 and about 250 and more preferably between about 100 and about 150, microns in thickness. If an RFID tag or other inclusion is a component of the label, then the label is typically between about 50 and about 725, preferably between about 75 and about 625 and more preferably between about 100 and about 400, microns in thickness.

The following example is illustrative of one specific embodiment of this invention. Unless otherwise noted, all parts and percentages are by weight.

SPECIFIC EMBODIMENTS

A label in the configuration of FIG. 1 was prepared using 50 micron 200 Dun-Guard Clear UV DP38 polyethylene terephthalate film with a silicone VOID pattern applied to its second planar surface as the second layer.

The pearlescent pigment layer was a coating made from a composition comprising (i) 1321.6 grams (g) of 36% solids Vitel® 2100B from Bostik Findley dissolved in a 50:50 blend of toluene and methyl ethyl ketone, (ii) 178.4 g of Iriodin® 110 fine satin pigment from EMD Industries, and (iii) 15.0 g of Dow Corning 29 Additive which is a carbinol functional glycol surfactant. This coating or layer was applied at 10 pounds/ream by reverse roll on the non-release side of the film. The coating dried to a thickness of 17 microns.

The pigmented adhesive layer was coating made from a composition comprising (i) 90.0 g Aroset 1085-Z-38 pressure sensitive acrylic adhesive available from Ashland Specialty Chemical, (ii) 30.0 g of toluene, (iii) 3.0 g of Monarch 1400 carbon black from Cabot Corporation, and (iv) 3.0 g of TiPure titanium dioxide from DuPont. This coating or layer was applied at 27 lb/ream by reverse roll on the release side of the film, and dried to a coating thickness of 33 microns. BR-148, a 55 pound, 3.1 mil one-side silicone release bleached glassine liner from Loparex was applied to the open side of the pigmented adhesive coating to protect it during storage.

The resultant label exhibited a silver appearance that compared favorably to commercial silver tamper evident products that are based on aluminized films, such as B-438, B-7576 and B-7575 sold by Brady Corporation. The label was printed by thermal transfer with a Brady Model 300X-Plus bench-top printer, using a Series R6000 black resin-based thermal transfer ribbon available from Brady Corporation, to yield black, crisp text and a readable barcode.

Although the invention has been described in considerable detail through the preceding description, drawings and example, this detail is for the purpose of illustration. One skilled in the art can make many variations and modifications without departing from the spirit and scope of the invention as described in the appended claims. All United States patents and published or allowed United States patent applications referenced above are incorporated herein by reference.

What is claimed is:

1. A nonmetallic, tamper-indicating, multi-layer label with a metallic appearance, the label comprising a pearlescent layer, a film layer, a patterned release layer, and a pigmented adhesive layer substantially free of pearlescent pigment, with the provisos that (i) the pigmented adhesive layer is an exterior layer of the label, optionally in contact with a release liner, (ii) the patterned release layer is an interior layer of the label, and (iii) the pearlescent layer provides the metallic appearance to the label.

2. The label of claim 1 comprising:
   A. The pearlescent layer comprising a pearlescent pigment and having first and second opposing planar surfaces,
   B. The film layer comprising a transparent or translucent polymer film and having first and second opposing planar surfaces, the first planar surface of the film layer in intimate contact with the second planar surface of the pearlescent layer,
   C. The patterned release layer comprising a release agent arrayed in a pattern and having first and second opposing planar surfaces, the first planar surface of the patterned release layer in intimate contact with at least a portion of the second planar surface of the film layer, and
   D. The pigmented adhesive layer substantially free of pearlescent pigment dispersed in an adhesive and having first and second opposing planar surfaces, the first planar surface of the adhesive layer in intimate contact with the second planar surface of the patterned release layer and the portion of the second planar surface of the film not in intimate contact with the first planar surface of the patterned release layer.

3. The label of claim 1 comprising:
   A. The film layer comprising a transparent or translucent polymer film and having first and second opposing planar surfaces,
   B. The pearlescent layer comprising pearlescent pigment and having first and second opposing planar surfaces, the first planar surface of the pearlescent layer in intimate contact with the second planar surface of the film layer,
   C. The patterned release layer comprising a release agent arrayed in a pattern and having first and second opposing planar surfaces, the first planar surface of the patterned release layer in intimate contact with at least a portion of the second planar surface of the pearlescent layer, and
   D. The pigmented adhesive layer substantially free of pearlescent pigment dispersed in an adhesive having first and second opposing planar surfaces, the first planar surface of the adhesive layer in intimate contact with the second planar surface of the patterned release layer and the portion of the second planar surface of the pearlescent layer not in intimate contact with the first planar surface of the patterned release layer.

4. The label of claim 1 comprising:
   A. The film layer comprising a transparent or translucent polymer film and having first and second opposing planar surfaces,
   B. The patterned release layer comprising a release agent arrayed in a pattern and having first and second opposing planar surfaces, the first planar surface of the patterned release layer in intimate contact with at least a portion of the second planar surface of the film layer,
   C. The pearlescent layer comprising a pearlescent pigment and having first and second opposing planar surfaces, the first planar surface of the pearlescent layer in intimate contact with the second planar surface of the patterned release layer and the portion of the second planar surface of the film layer not in intimate contact with the first planar surface of the patterned release layer, and
   D. The pigmented adhesive layer substantially free of pearlescent pigment dispersed in an adhesive having first and second opposing planar surfaces, the first planar surface of the adhesive layer in intimate contact with the second planar surface of the pearlescent layer.

5. The label of claim 1 in which the patterned release layer comprises a silicone compound.

6. The label of claim 1 in which the patterned release layer is arrayed in a word geometric or graphic pattern.

7. The label of claim 1 further comprising an RFID tag.

8. The label of claim 1 attached to an object.

9. The label of claim 8 in which the object is a cell phone.

10. The label of claim 1 in which the pigmented adhesive layer comprises at least one of carbon black and titanium dioxide.

11. The label of claim 1 in which the pigmented layer is either directly adjacent to or indirectly adjacent to the pearlescent layer.

12. The label of claim 1 in which the pearlescent layer is continuous.

13. A nonmetallic, tamper-indicating, multi-layer label with a metallic appearance, the label comprising a pearlescent layer, a film layer, a patterned release layer, a pigmented layer, and an adhesive layer with the provisos that (i) the adhesive layer is an exterior layer of the label, optionally in contact with a release liner, (ii) the pigmented layer is substantially free of pearlescent pigment and is adjacent to the adhesive layer, (iii) the patterned release layer is an interior layer of the label, and (iv) the pearlescent layer provides the metallic appearance to the label.

14. The label of claim 13 comprising:
   A. The pearlescent layer comprising a pearlescent pigment and having first and second opposing planar surfaces,
   B. The film layer comprising a transparent or translucent polymer film and having first and second opposing planar surfaces, the first planar surface of the film layer in intimate contact with the second planar surface of the pearlescent layer,
   C. The patterned release layer comprising a release agent arrayed in a pattern and having first and second opposing planar surfaces, the first planar surface of the patterned release layer in intimate contact with at least a portion of the second planar surface of the film layer,
   D. The pigmented layer substantially free of pearlescent pigment and having first and second opposing planar surfaces, the first planar surface of the pigmented layer in intimate contact with the second planar surface of the patterned release layer and the portion of the second planar surface of the film layer not in intimate contact with the first planar surface of the patterned release layer, and
   E. The adhesive layer comprising an adhesive and having first and second opposing planar surfaces, the first planar surface of the adhesive layer in intimate contact with the second planar surface of the pigmented layer.

15. The label of claim 13 comprising:
   A. The film layer comprising a transparent or translucent polymer film and having first and second opposing planar surfaces, B. The pearlescent layer comprising a pearlescent pigment and having first and second opposing planar surfaces, the first planar surface of the pearlescent layer in intimate contact with the second planar surface of the film layer, C. The patterned release layer comprising a release agent arrayed in a pattern and having first and second opposing planar surfaces, the first planar surface of the patterned release layer in intimate contact with at least a portion of the second planar surface of the pearlescent layer, D. The pigmented layer substantially free of pearlescent pigment and having first and second opposing planar surfaces, the first planar surface of the pigmented layer in intimate contact with the second planar surface of the patterned release layer and the portion of the second planar surface of the pearlescent layer not in intimate contact with the first planar surface of the patterned release layer, and E. The adhesive layer comprising an adhesive and having first and second opposing planar surfaces, the first planar surface of the adhesive layer in intimate contact with the second planar surface of the pigmented layer.

16. The label of claim 13 comprising:

A. The film layer comprising a transparent or translucent polymer film and having first and second opposing planar surfaces, B. The patterned release layer comprising a release agent arrayed in a pattern and having first and second opposing planar surfaces, the first planar surface of the patterned release layer in intimate contact with at least a portion of the second planar surface of the film layer, C. The pearlescent layer comprising a pearlescent pigment and having first and second opposing planar surfaces, the first planar surface of the pearlescent layer in intimate contact with the second planar surface of the patterned release layer and the portion of the second planar surface of the film layer not in intimate contact with the first planar surface of the patterned release layer, D. The pigmented layer substantially free of pearlescent pigment and having first and second opposing planar surfaces, the first planar surface of the pigmented layer in intimate contact with the second planar surface of the pearlescent layer, and E. The adhesive layer comprising an adhesive and having first and second opposing planar surfaces, the first planar surface of the adhesive layer in intimate contact with the second planar surface of the pigmented layer.

17. The label of claim 13 in which the patterned release layer comprises a silicone compound.

18. The label of claim 13 in which the patterned release layer is arrayed in a word geometric or graphic pattern.

19. The label of claim 13 further comprising an RFID tag.

20. The label of claim 13 attached to an object.

21. The label of claim 20 in which the object is a cell phone.

22. The label of claim 13 in which the pigmented layer comprises at least one of carbon black and titanium dioxide.

23. The label of claim 13 in which the pigmented layer is either directly adjacent to or indirectly adjacent to the pearlescent layer.

24. The label of claim 13 in which the pearlescent layer is continuous.

* * * * *